United States Patent
Gil et al.

(10) Patent No.: US 9,408,188 B2
(45) Date of Patent: Aug. 2, 2016

(54) METHOD AND APPARATUS FOR SCHEDULING A DOWNLINK PACKET IN A WIRELESS COMMUNICATION SYSTEM

(75) Inventors: Gye-Tae Gil, Daejeon (KR); Dong-Hoi Kim, Chuncheon-si (KR); Jung-Sup Song, Incheon (KR)

(73) Assignee: KT Corporation, Seongnam (KR)

( * ) Notice: Subject to any disclaimer, the term of this patent is extended or adjusted under 35 U.S.C. 154(b) by 246 days.

(21) Appl. No.: 13/818,922

(22) PCT Filed: Jun. 24, 2011

(86) PCT No.: PCT/KR2011/004611
§ 371 (c)(1),
(2), (4) Date: Feb. 25, 2013

(87) PCT Pub. No.: WO2012/026676
PCT Pub. Date: Mar. 1, 2012

(65) Prior Publication Data
US 2013/0148624 A1   Jun. 13, 2013

(30) Foreign Application Priority Data
Aug. 25, 2010   (KR) .................. 10-2010-0082474

(51) Int. Cl.
*H04W 72/04*   (2009.01)
*H04W 72/12*   (2009.01)

(52) U.S. Cl.
CPC .......... *H04W 72/04* (2013.01); *H04W 72/1242* (2013.01)

(58) Field of Classification Search
CPC . H04W 72/08; H04W 72/082; H04W 72/085; H04W 72/087; H04W 72/10; H04W 72/1226; H04W 72/1231; H04W 72/1236; H04W 72/04; H04W 72/1242; H04W 74/0875
See application file for complete search history.

(56) References Cited

U.S. PATENT DOCUMENTS

| | | | |
|---|---|---|---|
| 7,853,262 B2 * | 12/2010 | Cheon et al. | 455/450 |
| 2007/0115880 A1 | 5/2007 | Huh et al. | |
| 2007/0121547 A1 * | 5/2007 | Huh et al. | 370/329 |
| 2007/0201404 A1 | 8/2007 | Cheon et al. | |
| 2007/0280260 A1 | 12/2007 | Ryu et al. | |
| 2007/0297415 A1 | 12/2007 | Lee et al. | |
| 2008/0198814 A1 * | 8/2008 | Wengerter et al. | 370/336 |

(Continued)

FOREIGN PATENT DOCUMENTS

| | | |
|---|---|---|
| EP | 1 432 183 A2 | 6/2004 |
| KR | 10-2004-0003052 A | 1/2004 |

(Continued)

*Primary Examiner* — Min Jung
(74) *Attorney, Agent, or Firm* — Sughrue Mion, PLLC

(57) ABSTRACT

The present invention relates to a method and apparatus for scheduling a downlink packet in a wireless communication system, which preferentially appoints a combination of a traffic flow and a physical resource block (PRB) having a low per-bit transmission power requirement during real-time traffic scheduling, and allocates the remaining PRBs to non-real-time traffic using spare transmission power. For this purpose, the downlink packet scheduling method of the present invention comprises: an operation of performing real-time traffic scheduling, which involves carrying out the process of preferentially appointing a combination of traffic flow and a PRB having the lowest per-bit transmission power requirement; a step of performing non-real-time traffic scheduling, which involves allocating remaining PRBs, which remain after the allocation to the real-time traffic, to non-real-time traffic using spare transmission power.

17 Claims, 3 Drawing Sheets

(56) References Cited

U.S. PATENT DOCUMENTS

| | | | |
|---|---|---|---|
| 2009/0059860 A1* | 3/2009 | Maltsev et al. | 370/330 |
| 2009/0116439 A1* | 5/2009 | Madan et al. | 370/329 |
| 2009/0154415 A1* | 6/2009 | Park et al. | 370/329 |
| 2010/0061258 A1* | 3/2010 | Seo | H04B 7/0632 370/252 |
| 2010/0220607 A1* | 9/2010 | Fujishima et al. | 370/252 |
| 2010/0315968 A1* | 12/2010 | Zhou et al. | 370/252 |
| 2011/0199985 A1* | 8/2011 | Cai et al. | 370/329 |
| 2011/0274092 A1* | 11/2011 | Liu et al. | 370/335 |
| 2012/0327779 A1* | 12/2012 | Gell et al. | 370/238 |

FOREIGN PATENT DOCUMENTS

| | | |
|---|---|---|
| KR | 10-2004-0053859 A | 6/2004 |
| KR | 10-2006-0072487 A | 6/2006 |
| KR | 10-2006-0073471 A | 6/2006 |
| KR | 10-0660054 B1 | 12/2006 |
| KR | 10-2007-0054065 A | 5/2007 |
| KR | 10-0946901 B1 | 3/2010 |
| KR | 10-0969768 B1 | 7/2010 |
| WO | 02/100048 A1 | 12/2000 |
| WO | 2006/068445 A1 | 6/2006 |

* cited by examiner

METHOD AND APPARATUS FOR SCHEDULING A DOWNLINK PACKET IN A WIRELESS COMMUNICATION SYSTEM

CROSS-REFERENCES TO RELATED APPLICATIONS

The present application is a National Stage of International Application No. PCT/KR2011/004611, filed on Jun. 24, 2011, which claims priority from Korean Patent Application No. 10-2010-0082474, filed on Aug. 25, 2010, the contents of all of which are incorporated herein by reference in their entirety.

BACKGROUND

1. Field

Methods and apparatuses consistent with exemplary embodiments relate to a method and apparatus for scheduling a downlink packet in a wireless communication system, and more particularly, to a method and apparatus for scheduling a downlink packet, wherein a wireless communication base station which has to send a plurality of pieces of user traffic to each user receiver (user equipment) through shared radio resources selects a user traffic flow to be transmitted in a downlink for each point of time.

In other words, exemplary embodiments relate to a method and apparatus for scheduling a downlink packet, wherein a wireless communication base station which has to send a plurality of pieces of user real-time traffic and non-real-time traffic in a downlink by using a limited number of physical resource blocks (PRBs), selects a user traffic flow that will use PRBs in the downlink for each point of time of scheduling.

2. Description of the Related Art

In general, a downlink scheduler (i.e., a packet scheduler) plays a very important role in determining system performance in a recent wireless communication system using a packet switching method, such as 3$^{rd}$ generation partnership project (3GPP) long-term evolution (LTE).

This is because the amount of downlink transmission resources is limited, whereas if a proper scheduling method is not used, there is a danger of deteriorated quality of service (QoS) for corresponding traffic because downlink traffic experiences packet delay and a buffer overflow due to its burst characteristic.

FIG. 1 shows a construction according to an embodiment for the downlink of a wireless communication system in which exemplary embodiments are applied.

In general, an element that plays an important role in order to provide QoS for user traffic, is the downlink scheduler (i.e., the packet scheduler) 13 of a wireless base station. User traffic flows (downlink traffic) that have to be transmitted by the wireless base station in a downlink, as shown in FIG. 1, is stored in buffer memory 12 in which each traffic flow is designated by a traffic classifier 11. The downlink scheduler (i.e., the packet scheduler) 13 determines which packets of traffic flow, from among all the traffic flows, will be transmitted to user equipment 14 through wireless channels for every transmit time interval (TTI).

For reference, $N_{PRB}$ PRBs are present within one transmit time interval (TTI).

Meanwhile, since the total data throughput of a system and QoS for each traffic flow are determined depending on what criteria are applied to the process of selecting a traffic flow, there is a need for a scheduling method capable of evenly satisfying a QoS level requested by each user traffic flow and also maximizing the total data throughput of a system.

Representative scheduling methods, from among a variety of scheduling methods proposed so far in order to satisfy the requirements, include a round-robin method, a maximum through (MT) method, and a proportional fair (PF) method.

Each of the scheduling methods is described in more detail below.

First, the round-robin method is a method of selecting a traffic flow to be transmitted through each PRB according to specific sequence (e.g., in sequence of increasing traffic flow index) if N traffic flows are present. In this round-robin method, radio resources can be fairly distributed into all traffic flows because a transmission opportunity corresponding to the share of each traffic flow is assigned to each of all the traffic flows, but the total data throughput of a system is not optimized because the capacity of a radio link that is different for each user is not taken into consideration.

Next, the MT method is a method of selecting a combination of a PRB and a traffic flow through which the greatest amount of data can be transmitted because the traffic flow, from among traffic flows including packets to be transmitted in a buffer, has the best instantaneous channel capacity of a corresponding wireless channel and assigning an opportunity capable of sending the packets through the PRB to the traffic flow, as in [Equation 1] below.

$$(\hat{s}, \hat{n}) = \arg\max_{s,n} D_{s,n} \qquad [\text{Equation 1}]$$

Here, $D_{s,n}$ is the number of bits that is assumed in a system and that can be transmitted by a traffic flows through a PRB n and is determined based on a channel state information (CSI) value of the corresponding PRB.

This MT method is advantageous in that it can maximize the total data throughput of a system because a combination of a PRB and a traffic flow through which the greatest amount of data can be transmitted, but there is a limitation in which the QoS or fairness of traffic flows is not taken into consideration.

Next, the PF method is a method of calculating a ratio of the number of bits $D_{s,n}$ that can be transmitted through a corresponding PRB for each traffic flow and the total data throughput $R_S$ of a traffic flow that has been transmitted according to results allocated right before a PRB as a priority function and selecting a traffic flow having the greatest priority function, from among the calculated priority functions, so that the traffic flow is transmitted through the corresponding PRB, as in [Equation 2] in assigning a PRB.

$$(\hat{s}, \hat{n}) = \arg\max_{s,n} \frac{D_{s,n}}{R_s} \qquad [\text{Equation 2}]$$

This PF method can be considered as a method of slightly compromising the total data throughput and improving fairness as compared with the MT method.

The limitation of the PF method, however, is that it is difficult to provide QoS for a delay-sensitive traffic flow because packet delay is not taken into consideration like in the round-robin method.

SUMMARY

Accordingly, the conventional techniques have problems, such as those described above, and thus there is still a need for a "scheduling method capable of evenly satisfying a QoS level requested by each user traffic flow and also maximizing the total data throughput of a system". An object of the exemplary embodiments is to solve the problems and meet the demand. The exemplary embodiments may solve some of the problems of the conventional techniques, or may not address any problems of the conventional techniques.

Accordingly, an aspect of an exemplary embodiment is to provide a method and apparatus for scheduling a downlink packet, which are capable of improving the total data throughput and fairness of a system by using a limited number of PRBs and limited transmission power in the downlink of a wireless communication system using an adaptive modulation and coding (AMC) scheme.

That is, an aspect of an exemplary embodiment is to provide a method and apparatus for scheduling a downlink packet, wherein a combination of a PRB, having the smallest transmission power required per bit when scheduling for real-time traffic is performed, and a traffic flow is preferentially selected and PRBs remaining after PRBs are allocated to real-time traffic are allocated to non-real-time traffic by using excess transmission power, unlike in the existing methods of determining scheduling based on an MCS level (i.e., the transmission capacity of a PRB) determined based on CSI.

Aspects of the exemplary embodiments are not limited to the above, and other aspects and advantages of the exemplary embodiments that have not been described will be understood from the following description. Furthermore, it may be easily understood that the aspects and advantages of the exemplary embodiments can be realized by means written in the claims and a combination thereof.

In an exemplary embodiment, method includes, in a method of scheduling a downlink packet, the method comprising, a real-time traffic scheduling operation of performing a process of selecting a combination of a physical resource block (PRB) and a traffic flow, on all pieces of real-time traffic; and a non-real-time traffic scheduling operation of allocating PRBs remaining after allocation to the real-time traffic in the real-time traffic scheduling operation, to non-real-time traffic by using excess transmission power.

Meanwhile, an apparatus of an exemplary embodiment includes, in an apparatus for scheduling a downlink packet, real-time traffic scheduler configured to perform a process of selecting a combination of a physical resource block (PRB) and a traffic flow, on all pieces of real-time traffic; and non-real-time traffic scheduler configured to allocate PRBs, remaining after allocation by the real-time traffic scheduler of the real-time traffic, to non-real-time traffic by using excess transmission power.

The real-time traffic scheduling operation may comprise: a metric calculation operation of calculating a scheduling metric for combinations of the real-time traffic flows and available PRBs; selecting a combination of a real-time traffic flow and a PRB having a maximum calculated scheduling metric; and repeatedly performing all the processes on all the real-time traffic flows starting from the scheduling metric calculation operation.

The metric calculation operation may comprise calculating the scheduling metric by using a ratio of an excess channel gain and reception power required per bit.

The scheduling metric calculation operation may comprise calculating a scheduling metric $M(s,n)$ for a combination of a real-time traffic flow s and a PRB n according to the following equation, $$M(s, n) = \frac{\Delta_{s,n}}{f(b_{s,n})/b_{s,n}},\quad \text{[Equation]}$$

where $\Delta_{s,n}$ is the excess channel gain and $f(b_{s,n})/b_{s,n}$ indicates the reception power required per bit.

The scheduling metric calculation operation may comprise calculating the scheduling metric according to the following equation, $$M(s, n) = \frac{g_{s,n} - g_{min}(b_{s,n})}{\sigma_{s,n}^2 w(b_{s,n})},\quad \text{[Equation]}$$

where $g_{s,n}$ indicates a channel gain for the PRB n of downlink corresponding to the traffic flow s, $g_{min}(b_{s,n})$ indicates a minimum channel gain necessary to successfully send $b_{s,n}$ bits, $\sigma_{s,n}^2$ indicates a noise variance of subcarriers of the PRB n of user equipment corresponding to the traffic flow s, and $$w(b_{s,n}) = \frac{1}{3b_{s,n}}[Q^1(P_e/4)]^2(2^{b_{s,n}} - 1)$$

describes a target bit error rate (BER).

The non-real-time traffic scheduling operation comprises: checking whether unallocated PRBs are present or not if PRBs have been allocated to all the real-time traffic flows in the real-time traffic scheduling step; and if, as a result of the checking, the unallocated PRBs are present, allocating the unallocated PRBs to the non-real-time traffic flows so that a data throughput becomes a maximum in accordance with adaptive modulation coding (AMC) technology by using the excess transmission power.

The above-described method may further comprise checking whether or not PRBs have been allocated to all the real-time traffic flows that are waiting for buffers. Also, the scheduling the downlink pack may be based at least on capacity of at least one from among the PRBs, and excess channel gain.

The real-time traffic scheduler may comprise: a scheduling metric calculator configured to calculate a scheduling metric for combinations of the real-time traffic flows and available PRBs; a traffic scheduler configured to perform a process of selecting a combination of a real-time traffic flow and a PRB having a maximum scheduling metric, calculated by the scheduling metric calculator, on all the pieces of real-time traffic.

The scheduling metric calculator calculates the scheduling metric by using a ratio of an excess channel gain and reception power required per bit.

The apparatus of claim 7, wherein the non-real-time traffic scheduler allocates the PRBs, remaining after the allocation by the real-time traffic scheduler to all the real-time traffic flows, to the non-real-time traffic flows so that a data throughput becomes a maximum in accordance with adaptive modulation coding (AMC) technology by using the excess transmission power.

DETAILED DESCRIPTION OF EXEMPLARY EMBODIMENTS

The above aspects, characteristics, and merits will become more apparent from the following detailed description taken in conjunction with the accompanying drawings, and thus a person having ordinary skill in the art to which the present disclosure pertains may readily implement the technical spirit of the present invention. Furthermore, in describing exemplary embodiments, a detailed description of known art related to the exemplary embodiments will be omitted if it is deemed to make the gist of the present disclosure unnecessarily vague. Exemplary embodiments are described in detail below with reference to the accompanying drawings.

Throughout this specification, when it is described that one part is "connected" to the other part, the one part may be "directly connected" to the other part or "electrically connected" to the other part through a third element. Furthermore, when it is said that any part "includes" or "comprises" any element, it means the part does not exclude other elements, but may further include or comprise other elements, unless specially defined otherwise.

In an exemplary embodiment, in order to select a PRB allocated to real-time traffic for every scheduling time, a combination having minimum transmission power per bit, from among all combinations of all real-time traffic flows and PRBs, is selected. If transmission power allocated to real-time traffic is minimized by performing scheduling as described above and excess PRBs and excess transmission power are used to send non-real-time traffic, transmission delay requirements can be satisfied and the data throughput of non-real-time traffic can be maximized by giving priority to real-time traffic.

Figure 1:
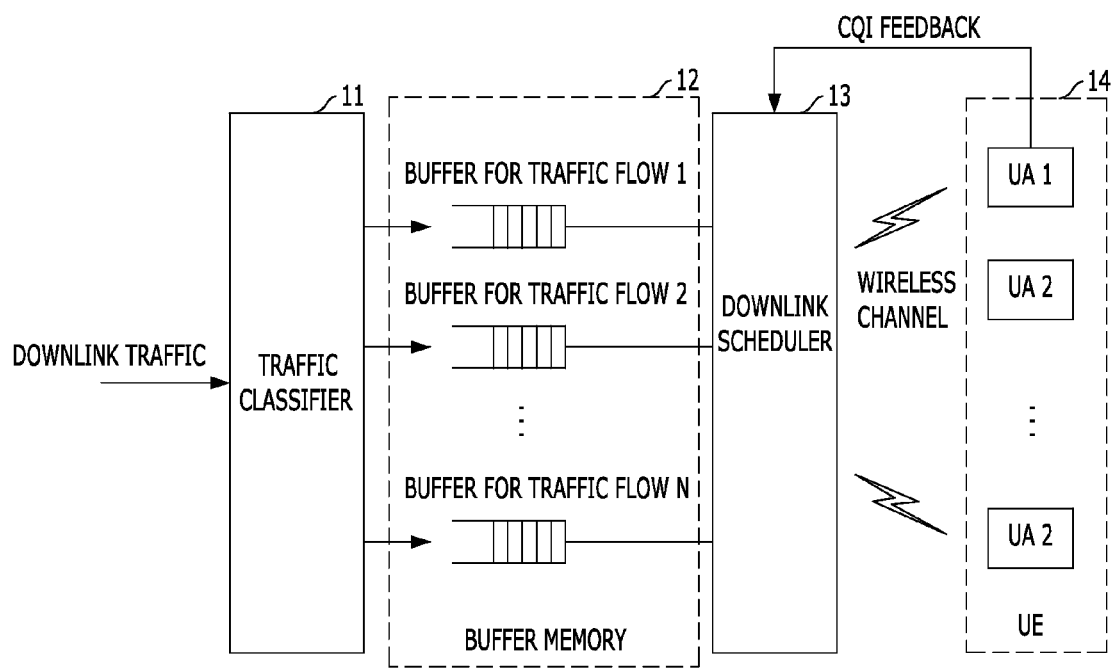
FIG. 1 shows a construction according to an embodiment for the downlink of a wireless communication system an exemplary embodiment is applied.
Figure 2:
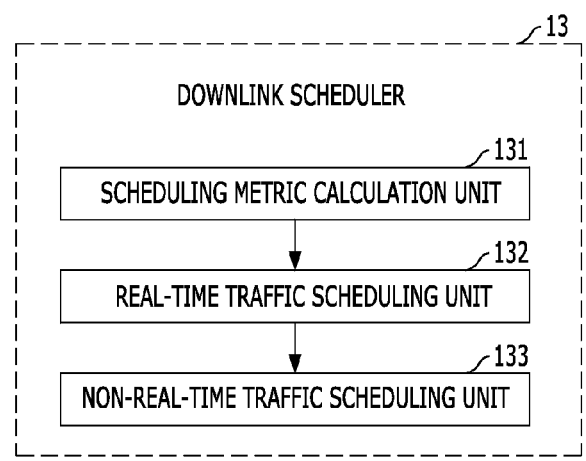
FIG. 2 shows a construction according to an exemplary embodiment of an apparatus for scheduling a downlink packet in a wireless communication system.

FIG. 2 shows a construction according to an exemplary embodiment of an apparatus for scheduling a downlink packet in a wireless communication system.

As shown in FIG. 2, the apparatus for scheduling a downlink packet (downlink scheduler) in a wireless communication system in accordance with an exemplary embodiment includes a scheduling metric calculation unit 131 for calculating a scheduling metric for all combinations of real-time traffic flows waiting for transmission in respective buffers and available physical resource blocks (PRBs), a real-time traffic scheduling unit 132 for performing a process of selecting a combination of a real-time traffic flow and a PRB, having a maximum calculated scheduling metric, on all pieces of real-time traffic, and a non-real-time traffic scheduling unit 133 for allocating PRBs remaining after PRBs are allocated to all the real-time traffic flows, to non-real-time traffic flows so that the data throughput becomes a maximum in accordance with adaptive modulation coding (AMC) technology, that is, a known adaptive modulation scheme.

Here, in calculating the scheduling metric for the combinations of the real-time traffic flows and the PRBs, the scheduling metric calculation unit 131 calculates the scheduling metric by utilizing a ratio of an excess channel gain and reception power required per bit.

Furthermore, the non-real-time traffic scheduling unit 133 allocates all the remaining PRBs to the non-real-time traffic flows so that the data throughput becomes a maximum in accordance with adaptive modulation coding (AMC) technology by using the entire excess transmission power.

Figure 3:
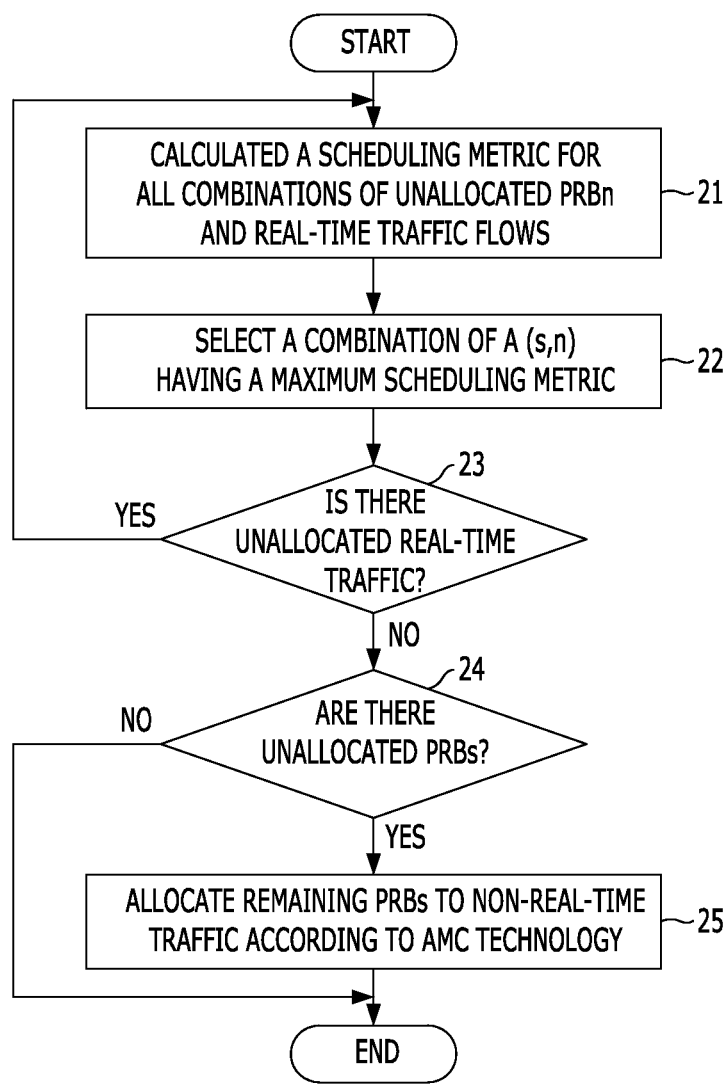
FIG. 3 shows a flowchart according to an exemplary embodiment for a method for scheduling a downlink packet in a wireless communication system.

FIG. 3 shows a flowchart according to an exemplary embodiment for a method for scheduling a downlink packet in a wireless communication system. This figure shows a procedure in which the downlink scheduler allocates a corresponding PRB to a traffic flow.

First, a scheduling metric for all combinations of real-time traffic flows waiting in respective buffers and available physical resource blocks (PRBs) are calculated (21).

Here, in calculating the scheduling metric for the combinations of the real-time traffic flows and the PRBs, the scheduling metric is calculated by utilizing a ratio of an excess channel gain and reception power required per bit.

Next, a combination of a real-time traffic flow and a PRB having a maximum calculated scheduling metric is selected (22).

Next, it is checked whether a combination of a real-time traffic flow and a PRB has been selected or not in relation to all real-time traffic flows that are waiting for transmission in the buffers (23). That is, it is checked whether or not PRBs has been allocated to all the real-time traffic flows that are waiting for the buffers.

If, as a result of the check (23), unallocated real-time traffic is present, the processes are repeatedly performed starting from the process "21". If PRBs have been allocated to all the real-time traffic flows (i.e., a combination of a real-time traffic flow and a PRB has been selected in relation to all the real-time traffic flows), it is checked whether unallocated PRBs are present or not (24). That is, it is checked whether or not there are PRBs remaining after PRBs are allocated to all the real-time traffic flows that are waiting for transmission in the buffers.

If, as a result of the check (24), unallocated PRBs are not present, the process is terminated. If unallocated PRBs are present (i.e., if there are PRBs remaining after PRBs are allocated to all the real-time traffic flows waiting for transmission in the buffers), the remaining PRBs (i.e., the unallocated PRBs) are allocated to non-real-time traffic flows so that the data throughput becomes a maximum in accordance with an adaptive modulation coding (AMC) technology, that is, a known adaptive modulation scheme (25). Here, the remaining PRBs are allocated to the non-real-time traffic flows so that the data throughput becomes a maximum in accordance with adaptive modulation coding (AMC) technology by using the entire excess transmission power.

Traffic flows that will use all PRBs are selected for each TTI by performing downlink packet scheduling as described above.

A detailed exemplary embodiment of the aforementioned method and apparatus for scheduling a downlink packet is described in more detail below with reference to FIG. 4.

Transmission power per bit that is expected when a traffic flow s uses a specific PRB n, is represented in [Equation 3] below.

$$\frac{P_{s,n}}{b_{s,n}} = \frac{f(b_{s,n})}{g_{s,n}b_{s,n}} \qquad \text{[Equation 3]}$$

Here, $P_{s,n}$ is transmission power in a base station that is necessary to send the traffic flow s by $b_{s,n}$ bits through the PRB n, $f(b_{s,n})$ is reception power in user equipment that is necessary to send the traffic flow s by $b_{s,n}$ bits through the PRB n, and $g_{s,n}$ indicates a channel gain for the PRB n of downlink corresponding to the traffic flow s. When a target BER is defined as $P_e$, $f(b_{s,n})$ can be represented as in [Equation 4] below.

$$f(b_{s,n}) = \frac{\sigma_{s,n}^2}{3}[Q^{-1}(P_e/4)]^2 (2^{b_{s,n}} - 1) \quad \text{[Equation 4]}$$

Here, $\sigma_{s,n}^2$ indicates a noise variance of the subcarriers of the PRB n in the user equipment that correspond to the traffic flow s, $$Q(x) = \frac{1}{\sqrt{2\pi}} \int_x^\infty e^{-\frac{t}{2}} dt.$$

Accordingly, the reception power $f(b_{s,n})$ in the user equipment that is necessary to send the traffic flow s by $b_{s,n}$ bits through the PRB n can be calculated more easily than the transmission power $P_{s,n}$ in the base station that is necessary to send the traffic flow s by $b_{s,n}$ bits through the PRB n. The reception power and the transmission power have a proportional relation as in [Equation 3], and thus the exemplary embodiment is described below by using the reception power $f(b_{s,n})$ in the user equipment. This is similar to using the transmission power in the base station.

Accordingly, a scheduling method of minimizing transmission power per bit can be represented as in [Equation 5] below.

$$(\hat{s}, \hat{n}) = \arg\min_{s,n} \frac{f(b_{s,n})}{g_{s,n} b_{s,n}} \quad \text{[Equation 5]}$$

Furthermore, assuming that a link adaptation scheme is applied to a downlink and the maximum possible transmission power per PRB in the base station is sufficiently large, [Equation 5] can be represented as in [Equation 6] below $$(\hat{s}, \hat{n}) = \arg\max_{s,n} M(s, n) \quad \text{[Equation 6]}$$

Here, a scheduling metric M(s,n) for a combination of the traffic flow s and the PRB n is represented as in [Equation 7] below.

$$M(s, n) = \frac{\Delta_{s,n}}{f(b_{s,n})/b_{s,n}} \quad \text{[Equation 7]}$$

Here, $\Delta_{s,n}$ is an excess channel gain and is defined as $\Delta_{s,n} = g_{s,n} - g_{min}(b_{s,n})$, where $g_{min}(b_{s,n})$ indicates a minimum channel gain that is necessary to successfully send $b_{s,n}$ bits, and $b_{s,n}$ is the greatest positive integer that satisfies $\Delta_{s,n} \geq 0$.

If the downlink scheduler in accordance with an exemplary embodiment is called a "minimum power (MP) scheduler", the MP scheduler allocates the PRB n to the traffic flow of user equipment that has a great excess channel gain as compared with reception power required per bit based on [Equation 7]. Furthermore, the PRB is allocated to user equipment having smaller reception power required per bit, from among pieces of user equipment having the same excess channel gain value.

Figure 4:
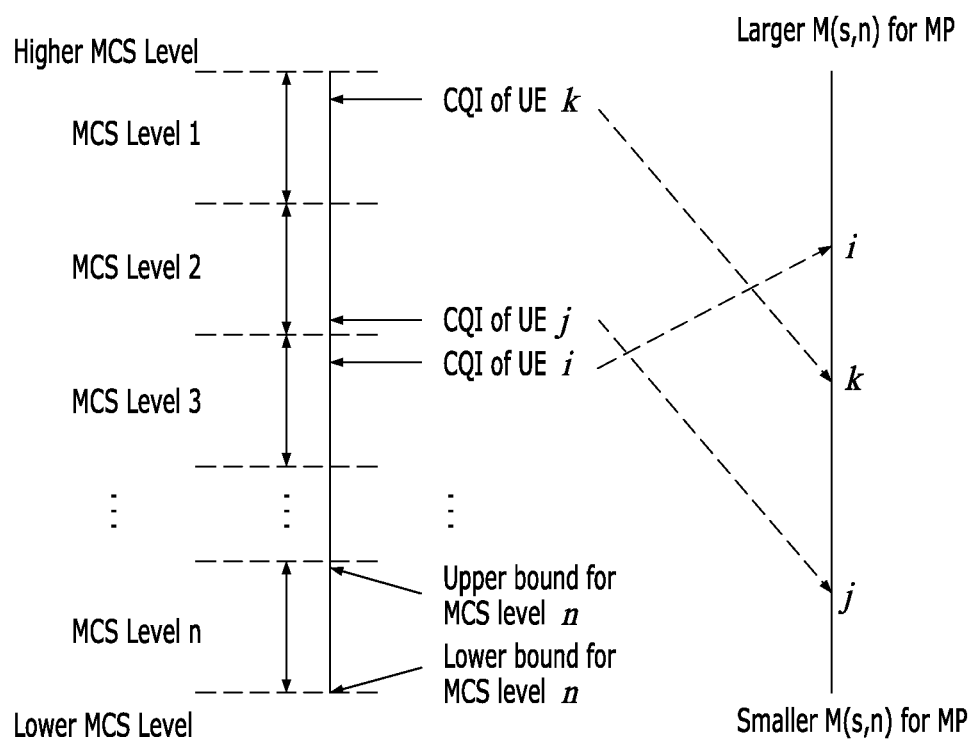
FIG. 4 is a diagram showing a relation between a scheduling metric and a channel gain in accordance with an exemplary embodiment.

For example, an instance in which the channel quality indicators (CQI) of pieces of user equipment (UE) i, j, and k are those of FIG. 4 is taken into consideration. FIG. 4 is a diagram showing a relation between a scheduling metric and a channel gain in accordance with an exemplary embodiment. In FIG. 4, it is assumed that the pieces of UE k and j are ranked as respective MCS levels 1 and 2 and the MCS level 1 means a higher data rate than the MCS level 2. In this case, the UE k requires lower transmission power per bit than the UE j even though it can send more bits than the UE j. This is because the UE k requires low transmission power because the CQI of the UE k is much larger than a minimum CQI necessary for the MCS level 1, whereas the UE j requires high transmission power as compared with other cases because the CQI of the UE j is close to a minimum value necessary for the MCS level 2.

Furthermore, the UE i has an excess channel gain having a similar level to that of the UE k, but requires reception power per bit that is relatively lower than that of the UE k. This is because the reception power $f(b_{s,n})/b_{s,n}$ required per bit increases exponentially according to $b_{s,n}$ and thus a reception power value per bit that is necessary for the UE i is smaller than that of the UE k which has a higher MCS level than the UE i. Accordingly, the MP scheduler of the exemplary embodiment determines priority in order of the pieces of UE i, k, and j as shown in FIG. 4 in allocating UE that will use the PRB n.

In order to reduce the degree of complexity of the MP scheduler, the scheduling metric of [Equation 7] can be rewritten into [Equation 8] below.

$$M(s, n) = \frac{g_{s,n} - g_{min}(b_{s,n})}{\sigma_{s,n}^2 w(b_{s,n})} \quad \text{[Equation 8]}$$

Here, $w(b_{s,n})$ is equal to [Equation 9] below, and $g_{min}(b_{s,n})$ and $b_{s,n}$ can be previously calculated in relation to all possible values of $b_{s,n}$.

$$w(b_{s,n}) = \frac{1}{3b_{s,n}}[Q^{-1}(P_e/4)]^2 (2^{b_{s,n}} - 1) \quad \text{[Equation 9]}$$

As described above, in the exemplary embodiment, in a wireless communication base station, downlink packet scheduling is performed by taking an MCS level and an excess channel gain into consideration.

Meanwhile, the aforementioned method for scheduling a downlink packet in a wireless communication system in accordance with the exemplary embodiments can be implemented in the form of a program command executable by various pieces of computer means and recorded on a computer-recordable medium. The computer-readable medium can include a program command, a data file, and a data structure solely or in combination. The program command recorded on the recording medium might have been specially designed and configured for the exemplary embodiments or may be known or available to a person who is skilled in computer software. Examples of the computer-readable recording medium include a variety of hardware apparatuses that are specially configured to store and execute a program command, such as magnetic media, such as a hard disk, a floppy disk, and a magnetic tape, optical media, such as compact disc (CD)-ROM and a digital versatile disc (DVD), magneto-optical media, such as a floptical disk, read-only memory (ROM), random-access memory (RAM), and flash memory. The medium may be a transmission medium, such as light, a metal line, or a waveguide including a carrier for sending a signal that designates a program command, a data structure, etc. Examples of the program command include a machine code, such as one written by a compiler, and a high-level language code executable by a computer by using an interpreter. The hardware apparatus can be configured in the form of one or more software modules for performing the operation of the exemplary embodiments, and the vice versa.

Although the present disclosure has been described in connection with the limited exemplary embodiments and the drawings, the present invention is not limited to the embodiments. A person having ordinary skill in the art to which the present disclosure pertains can substitute, modify, and change the exemplary embodiments without departing from the technical spirit of the present invention.

Accordingly, the scope of the present invention should not be limited to the aforementioned exemplary embodiments, but should be defined by the claims and equivalents thereof.

As described above, an aspect of the exemplary embodiments is that they can, for example, increase the total data throughput while satisfying transmission delay requirements by sending as many pieces of real-time traffic as possible by using a limited number of PRBs and limited transmission power and sending non-real-time traffic using PRBs remaining after allocation to real-time traffic flows and excess transmission power.

That is, the exemplary embodiments disclosed herein may minimize transmission power allocated to real-time traffic by selecting a combination of a real-time traffic flow and a PRB having a minimum transmission power per bit, from all combinations of real-time traffic flows and PRBs in order to select a PRB allocated to real-time traffic for every scheduling time and may satisfy transmission delay requirements by the preferential allocation to real-time traffic and maximize the data throughput of non-real-time traffic by using the remaining PRBs and excess transmission power for the transmission of non-real-time traffic.

The exemplary embodiments disclosed herein may be used in downlink packet scheduling, etc. in a wireless communication system.

What is claimed is:
1. A method of scheduling a downlink packet, the method comprising:
a real-time traffic scheduling operation comprising allocating a physical resource block (PRB) to a traffic flow, wherein the real-time traffic scheduling operation is performed on all pieces of real-time traffic, and the real-time traffic is transmitted by using a first transmission power in a downlink; and
a non-real-time traffic scheduling operation comprising allocating PRBs remaining after allocation to the real-time traffic in the real-time traffic scheduling operation, to non-real-time traffic, wherein the non-real-time traffic is transmitted by using a second transmission power in the downlink, the second transmission power being an excess transmission power relative to the first transmission power, and not being used to transmit the real-time traffic,
wherein the real-time traffic scheduling operation calculates a scheduling metric on all real-time traffic flows,
wherein the real-time traffic scheduling operation and the non-real-time traffic scheduling operation are performed by using an excess channel gain and reception power required per bit.

2. The method of claim 1, wherein the real-time traffic scheduling operation further comprises:
a metric calculation operation of calculating the scheduling metric for combinations of the real-time traffic flows and respective available PRBs;
selecting a combination of a real-time traffic flow and a PRB, the combination having a maximum calculated scheduling metric; and
repeatedly performing all the processes on all the real-time traffic flows starting from the metric calculation operation.

3. The method of claim 2, wherein the metric calculation operation comprises calculating the scheduling metric by using a ratio of the excess channel gain and the reception power required per bit.

4. The method of claim 2, wherein the metric calculation operation comprises calculating the scheduling metric $M(s,n)$ for a combination of a real-time traffic flow s and a PRB n according to Equation 1, $$M(s, n) = \frac{\Delta_{s,n}}{f(b_{s,n})/b_{s,n}}, \qquad \text{[Equation 1]}$$

where $\Delta_{s,n}$ is the excess channel gain and $f(b_{s,n})/b_{s,n}$ indicates the reception power required per bit.

5. The method of claim 2, wherein the metric calculation operation comprises calculating the scheduling metric $M(s,n)$ for a combination of a real-time traffic flow s and a PRB n according to Equation 1, $$M(s, n) = \frac{g_{s,n} - g_{min}(b_{s,n})}{\sigma_{s,n}^2 w(b_{s,n})}, \qquad \text{[Equation 1]}$$

where $g_{s,n}$ indicates a channel gain for the PRB n of downlink corresponding to the traffic flow s, $g_{min}(b_{s,n})$ indicates a minimum channel gain necessary to successfully send $b_{s,n}$ bits, $\sigma_{s,n}^2$ indicates a noise variance of subcarriers of the PRB n of user equipment corresponding to the traffic flow s, and $$w(b_{s,n}) = \frac{1}{3b_{s,n}}[Q^{-1}(P_e/4)]^2 (2^{b_{s,n}} - 1)$$

describes a target bit error rate (BER).

6. The method of claim 1, wherein the non-real-time traffic scheduling operation comprises:
checking whether unallocated PRB s are present or not, if PRB s have been allocated to all the real-time traffic flows in the real-time traffic scheduling operation; and
if, as a result of the checking, the unallocated PRBs are present, allocating the unallocated PRBs to non-real-time traffic flows so that a data throughput becomes a maximum in accordance with adaptive modulation coding (AMC) technology, by using the second transmission power.

7. The method of claim 6, further comprising checking whether or not PRBs have been allocated to all the real-time traffic flows that are waiting on buffers for transmission.

8. The method of claim 6, wherein if, as a result of the checking, the unallocated PRBs are not present, the scheduling operations are stopped.

9. The method of claim 1, wherein the scheduling the downlink packet is based at least on a transmission capacity of at least one from among the PRBs, and the excess channel gain.

10. An apparatus for scheduling a downlink packet, the apparatus comprising:
real-time traffic scheduler configured to allocate a physical resource block (PRB) to a traffic flow, wherein said allocation is performed on all pieces of real-time traffic, and the real-time traffic is transmitted by using first transmission power in a downlink; and
non-real-time traffic scheduler configured to allocate PRBs remaining after allocation by the real-time traffic scheduler of the real-time traffic, to non-real-time traffic, wherein the non-real-time traffic is transmitted by using a second transmission power, the second transmission power being an excess transmission power relative to the first transmission power, and not being used to transmit the real-time traffic,
wherein the real-time traffic scheduler calculates a scheduling metric on all real-time traffic flows,
wherein the real-time traffic scheduler and the non-real-time traffic scheduler operate by using an excess channel gain and reception power required per bit.

11. The apparatus of claim 10, wherein the real-time traffic scheduler comprises:
a scheduling metric calculator configured to calculate the scheduling metric for combinations of the real-time traffic flows and respective available PRBs;
a traffic scheduler configured to perform a process of selecting a combination of a real-time traffic flow and a PRB, the combination having a maximum scheduling metric and the maximum scheduling metric being calculated by the scheduling metric calculator, on all the pieces of real-time traffic.

12. The apparatus of claim 11, wherein the scheduling metric calculator calculates the scheduling metric by using a ratio of between the excess channel gain and the reception power required per bit.

13. The apparatus of claim 12, wherein the scheduling metric calculator calculates a scheduling metric for a combination of a real-time traffic flow s and a PRB n according to Equation 1, $$M(s, n) = \frac{\Delta_{s,n}}{f(b_{s,n})/b_{s,n}}, \quad \text{[Equation 1]}$$

where $\Delta s,n$ is the excess channel gain and $f(b_{s,n})/b_{s,n}$ indicates the reception power required per bit.

14. The apparatus of claim 12, wherein the scheduling metric calculator calculates the scheduling metric according to Equation 1, $$M(s, n) = \frac{g_{s,n} - g_{min}(b_{s,n})}{\sigma_{s,n}^2 w(b_{s,n})}, \quad \text{[Equation 1]}$$

where, $g_{s,n}$ indicates a channel gain for the PRB n of downlink corresponding to the traffic flow s, $g_{min}(b_{s,n})$ indicates a minimum channel gain necessary to successfully send $b_{s,n}$ bits, $\sigma_{s,n}^2$ indicates a noise variance of subcarriers of the PRB n of user equipment corresponding to the traffic flow s, and $$w(b_{s,n}) = \frac{1}{3b_{s,n}}[Q^{-1}(P_e/4)]^2 (2^{b_{s,n}} - 1)$$

describes a target bit error rate (BER).

15. The apparatus of claim 10, wherein the non-real-time traffic scheduler allocates the PRB s, remaining after the allocation by the real-time traffic scheduler of all the real-time traffic flows, to the non-real-time traffic flows so that a data throughput becomes a maximum in accordance with adaptive modulation coding (AMC) technology, by using the second transmission power.

16. The apparatus of claim 15, wherein some of the PRBS are allocated to the real-time traffics flows that are waiting on buffers for transmission.

17. The apparatus of claim 10, wherein the scheduling the downlink packet is based at least on a transmission capacity of at least one from among the PRBs, and excess channel gain.

* * * * *